(12) United States Patent
Andersen (10) Patent No.: US 11,722,827 B2
(45) Date of Patent: Aug. 8, 2023

(54) HEARING DEVICE WITH POWER SUPPLY MANAGEMENT AND RELATED METHOD

(71) Applicant: GN Hearing A/S, Ballerup (DK)

(72) Inventor: Kim Fälling Andersen, Borup (DK)

(73) Assignee: GN HEARING A/S, Ballerup (DK)

( * ) Notice: Subject to any disclaimer, the term of this patent is extended or adjusted under 35 U.S.C. 154(b) by 30 days.

(21) Appl. No.: 17/443,002

(22) Filed: Jul. 19, 2021

(65) Prior Publication Data

US 2022/0070595 A1 Mar. 3, 2022

(30) Foreign Application Priority Data

Aug. 26, 2020 (DK) .............................. PA 2020 70554

(51) Int. Cl.
*H04R 25/00* (2006.01)
*H02J 50/10* (2016.01)
(52) U.S. Cl.
CPC ............ *H04R 25/554* (2013.01); *H02J 50/10* (2016.02); *H04R 2225/31* (2013.01); *H04R 2225/33* (2013.01)
(58) Field of Classification Search
CPC . H04R 2225/33; H04R 2225/31; H02J 50/10; H02J 25/554
See application file for complete search history.

(56) References Cited

U.S. PATENT DOCUMENTS

| | | | |
|---|---|---|---|
| 2007/0259629 A1 | 11/2007 | Lee | |
| 2007/0274550 A1* | 11/2007 | Baechler | H04R 25/554 |
| | | | 381/314 |
| 2014/0321682 A1* | 10/2014 | Kofod-Hansen | H04R 25/30 |
| | | | 381/315 |
| 2017/0164120 A1 | 6/2017 | Johansen et al. | |
| 2019/0268706 A1 | 8/2019 | Solum et al. | |
| 2020/0245869 A1 | 8/2020 | Sivan et al. | |

FOREIGN PATENT DOCUMENTS

| | | | | |
|---|---|---|---|---|
| CA | 2430356 | | 12/2004 | |
| EP | 1860914 | | 11/2007 | |
| EP | 2871857 | | 5/2015 | |
| EP | 3396833 | | 10/2018 | |
| EP | 3396833 | A1 * | 10/2018 | .............. H02M 1/44 |
| EP | 3637800 | | 4/2020 | |

OTHER PUBLICATIONS

Extended European search report dated Jan. 13, 2022 for EP 21185283.5.
Foreign office Action dated Oct. 30, 2020 for Danish Patent Application No. PA 2020 70554.

* cited by examiner

*Primary Examiner* — Sunita Joshi
(74) *Attorney, Agent, or Firm* — Vista IP Law Group, LLP (57) ABSTRACT

A hearing device and a method for power supply management of a hearing device is provided, the hearing device comprising a processing unit; a main power source; a first power supply connected to the main power source unit; a magnetic induction unit configured for reception and transmission of wireless signals; wherein the hearing device is configured to deactivate the first power supply during reception of wireless signals.

22 Claims, 3 Drawing Sheets

HEARING DEVICE WITH POWER SUPPLY MANAGEMENT AND RELATED METHOD

RELATED APPLICATION DATA

This application claims priority to, and the benefit of, Danish Patent Application No. PA 2020 70554 filed on Aug. 26, 2020. The entire disclosure of the above application is expressly incorporated by reference herein.

FIELD

The present disclosure relates to a hearing device and related methods including a method for power supply management of a hearing device.

BACKGROUND

In the field of hearing devices, noise generated from various electronic components in the hearing devices, e.g. electromagnetic noise, entails challenges for the hearing device designers. Many different electronic components need to be fitted in reduced space which makes it difficult to fit and arrange the electronic components of the hearing device without disturbing each other. Shielding arrangements of various electronic components are therefore used to shield electronic components that generate noise which is subject to disturb other electronic components in the hearing device. However, shielding arrangements are in many situations not suitable for hearing devices, e.g. due to the fact that shielding arrangements may be cumbersome and be difficult to fit in the hearing devices.

SUMMARY

Accordingly, there is a need for hearing devices and methods with improved power management and noise handling.

A hearing device is disclosed, the hearing device comprising a processing unit. The hearing device comprises a main power source; a first power supply connected to the main power source; and a magnetic induction unit configured for reception and optionally transmission of wireless signals. The hearing device, such as the processing unit and/or the magnetic induction unit, is optionally configured to deactivate the first power supply during reception and/or transmission of wireless signals.

Further, a method for power supply management of a hearing device comprising a processing unit; a main power source; a first power supply; and a magnetic induction unit configured for reception and transmission of wireless signals, is disclosed. The method comprises deactivating the first power supply during reception of wireless signals.

The present disclosure provides a hearing device with improved power management and/or improved noise handling. Further, present disclosure provides an increased design freedom for the hearing device designer, in turn allowing smaller hearing aids and/or increased functionality.

The improved power management results in turn in an improved noise handling, e.g. reducing noise generated by various electronic components in the hearing device. For example, an advantage of the hearing device being configured to deactivate the first power supply during reception of wireless signals is that noise generated by the first power supply when the first power supply is active, may be avoided, e.g. reduced, substantially removed, and/or completely removed.

In addition, the noise reduction in the hearing device is provided without increasing the shielding of electronic components in the hearing device.

For example, by deactivating the first power supply during reception of wireless signals, the need for shielding of the electronic components in the hearing device is reduced. It may therefore not be needed to shield the first power supply e.g. to shield the electronic components of the hearing device from the electromagnetic noise generated by the first power supply.

In turn, by reducing the shielding in the hearing device, the size of the hearing device may be reduced, since less space is required for shielding in the hearing device.

In other words, deactivating the first power supply during reception of wireless signals may provide a better co-existence of the electronic components in the hearing device and a more reliable hearing device is provided.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable or a hearing aid, wherein the processing unit is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid.

The hearing device may be configured for wireless communication with, e.g. reception of wireless signals from and/or transmission of wireless signals to, one or more devices, such as with another hearing device, e.g. as part of a binaural hearing system, and/or with one or more accessory devices, such as a smartphone and/or a smart watch. The hearing device optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a radio transceiver e.g. also denoted or forming part of magnetic induction unit, coupled to the antenna (e.g. as part of the magnetic induction unit) for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device optionally comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal. The set of microphones may provide one or more input signals to the processing unit. The processing unit may process input signal(s) from the one or more microphones and/or optionally a radio transceiver. The processing unit may provide an output signal to a receiver, such as an output transducer, for conversion to an audio output signal.

The hearing device comprises a processing unit for processing input signals, such as (optionally pre-processed) transceiver input signal(s) from magnetic induction unit and/or (optionally pre-processed) microphone input signal(s) from the microphone(s). The processing unit is optionally configured to compensate for hearing loss of a user of the hearing device. The processing unit provides an electrical output signal based on the input signals to the processing unit.

The hearing device may comprise a first housing and optionally a second housing. A housing, such as the first housing and/or the second housing, may be configured to accommodate one or more of the processing unit, a main power source, a first power supply, a magnetic induction unit, and a second power supply. The hearing device may be of the in-the-ear (ITE) type or in-the-canal (ITC) type and comprise a first housing configured as an in-the-ear housing to be worn in or at the ear canal of a user. As an alternative the hearing device may comprise a first housing optionally configured as a behind-the-ear housing to be worn behind the pinna of a user and optionally a second housing optionally configured as an earpiece housing to be worn in or at the ear canal of a user. A wire may connect the first housing and the second housing.

The hearing device comprises a main power source. The main power source may comprise a power output terminal for providing electrical power to electrical components of the hearing device, such as one or more of a processing unit, magnetic induction unit, first power supply, and a second power supply.

The main power source may comprise a power source, such as one or more batteries and/or battery packs. The main power source may comprise one or more power sources, such as one or more batteries, e.g. a battery pack comprising one or more batteries, such as one battery, two batteries, three batteries. The main power source may comprise one or more batteries, such as button cell batteries. The one or more batteries may comprise one or more of Lithium batteries, Nickel batteries, and/or Lead batteries. The battery/batteries may be air-activated. The main power source may be rechargeable, e.g. via an interface of the hearing device. The main power source may be rechargeable via a connector for connecting a power cable.

The main power source may comprise a fuel cell, e.g. a fuel cell using one or more of ethanol, propanol, methanol, as a fuel.

The main power source may be a rechargeable power source, such as a rechargeable battery and/or a rechargeable fuel cell, e.g. refueling the fuel cell with fuel.

The hearing device comprises a first power supply connected to the main power source. The first power supply may provide electrical power to one or more electrical components of the hearing device, such as a processing unit, magnetic induction unit, and a second power supply. The first power supply may receive power from the main power source via a first power input terminal of the first power supply.

The hearing device optionally comprises a second power supply. The second power supply may be or comprise a power reservoir and/or an energy storage. The second power supply may comprise one or more capacitors optionally charged during transmission and/or discharged during reception in the magnetic induction unit.

The first power supply may act as a switch regulator to convert electrical power and provide electrical power to the one or more electrical components of the hearing device via one or more power output terminals including a first power output terminal of the first power supply. The first power supply may receive a main voltage $V\_M$ from the main power source, or a converted main voltage, as first input voltage, $V\_I\_1$, and convert the DC voltage $V\_I\_1$ to one or more output voltages including a first output voltage $V\_O\_1$ and/or a second output voltage $V\_O\_2$. The first input voltage, $V\_I\_1$, may be in the range from 1V to 4V. The processing unit may be fed from the main power source by main voltage $V\_M$ or by a processing voltage $V\_P$ from a processor power supply. The magnetic induction unit may be fed from the first power supply by first output voltage on first output terminal of the first power supply. Thus, the magnetic induction unit may have a power input terminal connected to the power output terminal of the first power supply.

In one or more exemplary hearing devices, the first power supply may be or comprise a switch-mode power supply. The switch-mode power supply (SMPS) may act as switching regulator to convert electrical voltage and provide converted voltage(s) to the one or more components of the hearing device. To deactivate the first power supply during reception of wireless signals may comprise deactivating and/or switching off the switch-mode power supply of the first power supply.

The hearing device comprises a magnetic induction unit for reception and/or transmission of wireless signals. In other words, the magnetic induction unit may be configured for reception and/or transmission of wireless signals, such as a first wireless signal. The magnetic induction unit may be configured to convert the first wireless signal to a first electrical signal and/or to convert a first electrical signal to a first wireless signal.

The first electrical signal may be provided to/from the processing unit, such as via a data terminal and/or a processing control terminal of the magnetic induction unit connected to respective data terminal and/or control terminal of the processing unit.

A control output of the magnetic induction unit may be connected to a control input (control terminal) of the processing unit. The magnetic induction unit may control the processing unit according to a selected power in order to apply the selected power mode in the hearing device. A control output, such as first control output, of the magnetic induction unit may be connected to a control input of the first power supply and/or to a control input of the second power supply. The magnetic induction unit may act as a power controller, such as a power management controller. The magnetic induction unit may be configured to select a power mode of the hearing device based on a transmission and reception scheme of the hearing device, i.e. based on whether the hearing device is receiving or transmitting wireless signals.

The magnetic induction unit may comprise a magnetic induction circuit, such as a radio transceiver. The magnetic induction unit may comprise an antenna, such as a magnetic induction antenna, MI antenna, e.g. a magnetic induction radio. The hearing device may be configured to transmit and/or receive one or more wireless data and/or control signals via the magnetic induction unit.

The hearing device is configured to deactivate the first power supply during reception of wireless signals in the magnetic induction unit.

An advantage of the hearing device being configured to deactivate the first power supply during reception of wireless signals is that noise generated by the first power supply when the first power supply is active, may be avoided, e.g. reduced, substantially removed, and/or completely removed. The noise generated by the first power supply may be electromagnetic noise. The first power supply may generate electromagnetic fields of different magnitudes and at different frequencies, thereby creating electromagnetic interference between one or more electronic components of the hearing device. For example, the first power supply may generate noise disturbing one or more of the processing unit, the main power source, and the magnetic induction unit. The electromagnetic interference may be more or less disturbing depending on the electronic components e.g. depending on the operating frequencies of the electronic components and the magnitude of the electromagnetic fields. The operation of the first power supply may therefore be more disturbing for the hearing device during reception of wireless signals. For example, when the hearing device is receiving wireless signals, e.g. via the magnetic induction unit.

Further, by deactivating the first power supply during reception of wireless signals, the need for shielding of the electronic components in the hearing device is reduced. For example, it may therefore not be needed to shield the first power supply e.g. to shield the electronic components of the hearing device from the electromagnetic noise generated by the first power supply. By reducing the need for shielding in the hearing device, the size of the hearing device may be reduced.

In other words, deactivating the first power supply during reception of wireless signals may provide a better co-existence of the electronic components in the hearing device.

In one or more exemplary hearing devices, to deactivate the first power supply comprises to deactivate the first power supply by transmitting a control signal to the first power supply, e.g. from the magnetic induction unit or from the processing unit.

The hearing device/magnetic induction unit may transmit in transmission periods including a first transmission period, tx_1, and/or receive in receiving periods including a first receiving period, rx_1. The hearing device may be configured to deactivate the first power supply, e.g. shortly before and/or during the receiving periods including first receiving period, rx_1, in turn avoiding noise from the first power supply while the hearing device is receiving one or more wireless signals.

In one or more exemplary hearing devices, the hearing device comprises a second power supply configured to supply power to the magnetic induction unit before and/or during reception of wireless signals, e.g. when the first power supply is deactivated. In other words, the second power supply is configured to supply power to the magnetic induction unit when the first power supply is deactivated, such as before and/or during the first receiving period rx_1. Thus, the second power supply may be configured to supply power to the magnetic induction unit in a part of transmission periods of the magnetic induction unit. The second power supply may be connected to the first power supply and/or the main power source, e.g. for charging the second power supply during transmission period(s).

The second power supply may comprise a power output terminal for providing electrical power to the magnetic induction unit, such as via a power input terminal, during reception of wireless signals.

In one or more exemplary hearing devices, the first power supply and/or the main power source is configured to supply power to the second power supply during transmission of wireless signals, i.e. during transmission periods of the magnetic induction unit. For example, the first power supply and/or the main power source may charge the second supply in or during the transmission period(s) of the magnetic induction unit. The hearing device may be configured to supply power to the second power supply during transmission period(s) including the first transmission period tx_1 of the magnetic induction unit.

The second power supply may accumulate power supplied from the first power supply when the first power supply is active. The second power supply may be configured to take over the role of the first power supply during reception of wireless signals, i.e. when the first power supply is deactivated.

In one or more exemplary hearing devices, the second power supply comprises a capacitor. The second power supply may comprise one or more capacitors, e.g. two capacitors arranged in series or in parallel. The capacitor may accumulate power supplied from the first power supply when the first power supply is active. The capacitor may be configured to store energy provided from the first power supply, e.g. the capacitor may be charged when the first power supply is active. The capacitor may be configured to discharge the stored energy when the first power supply is deactivated, e.g. during reception in the magnetic induction. In other words, the capacitor may supply power to the magnetic induction unit when the first power supply is deactivated.

In one or more exemplary hearing devices, to deactivate the first power supply comprises to deactivate the first power supply by transmitting a control signal to the first power supply from the magnetic induction unit or from the processing unit. In other words, the first power supply may be configured to receive a control signal for deactivation and/or activation of the first power supply.

Further, a method for power supply management of a hearing device is disclosed. The hearing device comprises a processing unit; a main power source; a first power supply, and a magnetic induction unit configured for reception and transmission of wireless signals. It is to be noted that descriptions related to the hearing device also apply the method disclosed herein and vice versa.

The method comprises deactivating the first power supply, e.g. before and/or during reception of wireless signals, e.g. in the magnetic induction unit.

In one or more exemplary hearing devices and/or methods, the method comprises supplying power to the magnetic induction unit from a second power supply, e.g. during and/or before reception of wireless signals, e.g. in the magnetic induction unit.

In one or more exemplary hearing devices and/or methods, the method comprises supplying power to the second power supply from the first power supply, e.g. during transmission of wireless signals.

In one or more exemplary hearing devices and/or methods, the act of deactivating the first power supply comprises transmitting a control signal to the first power supply from the magnetic induction unit or from the processing unit.

Figure 1:
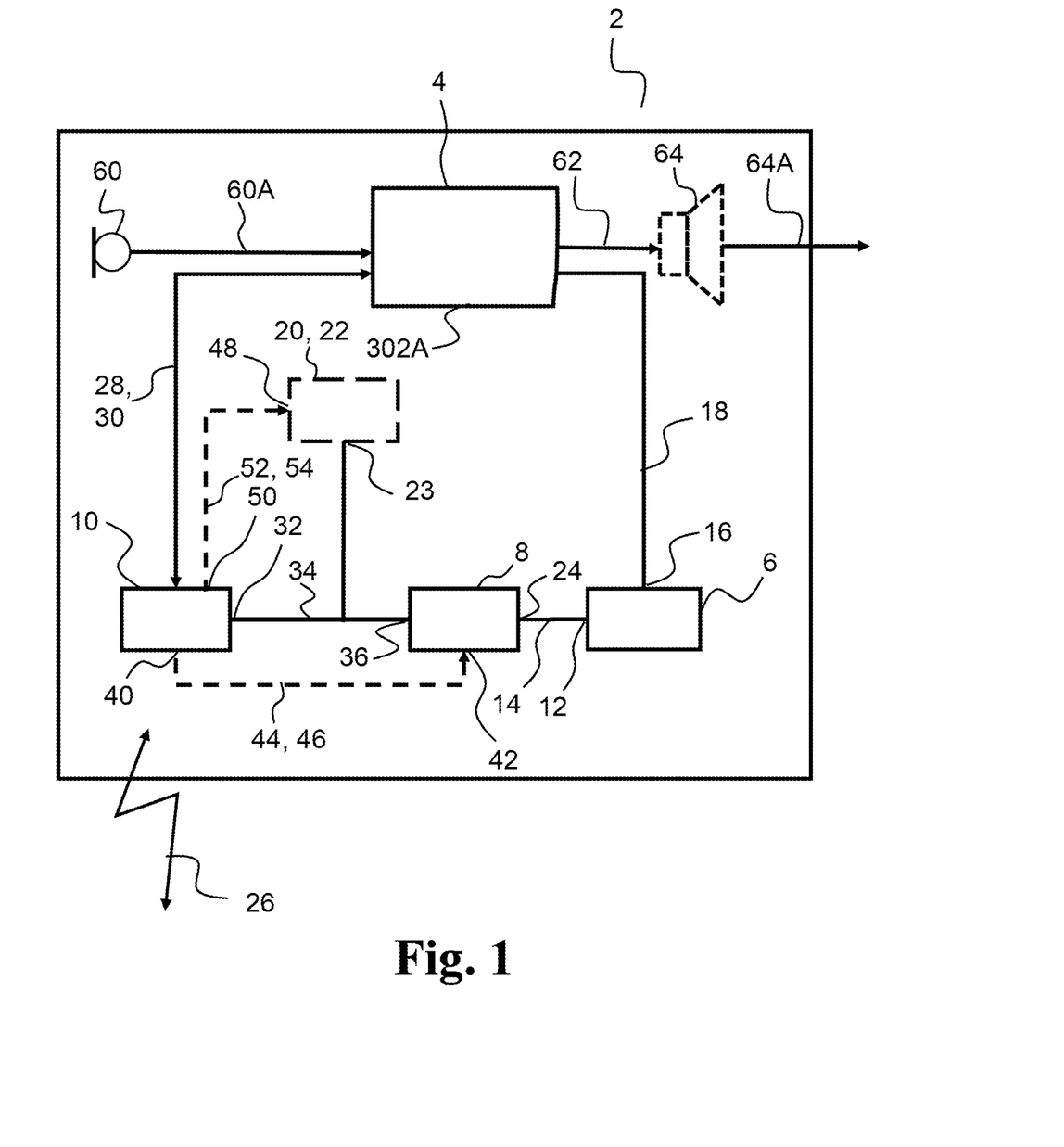
FIG. 1 is a schematic block diagram of an exemplary hearing device.

FIG. 1 schematically illustrates an exemplary hearing device. The hearing device 2 comprises a processing unit 4. The processing unit 4 may be configured to compensate for hearing loss. The hearing device 2 comprises a main power source 6, a first power supply 8, and a magnetic induction unit 10. The main power source 6 may comprise one or more power output terminals for providing electrical power to electrical components of the hearing device 2 via one or more power rails. For example, the main power source 6 comprises a first power output terminal 12 connected to a first power rail 14 for feeding a first voltage/power to one or more electrical components including the first power supply 8. The first power rail 14 may feed the processing unit 4. A second power output terminal 16 of the main power source 6 may be connected to a second power rail 18, e.g. for feeding a second voltage/power to the processing unit 4.

The hearing device 2 comprises a second power supply 20 optionally including one or more capacitors including a first capacitor 22. The second power supply 20 comprises a (first) power terminal 23 for input and/or output of power to/from the second power supply 20. In one or more exemplary hearing devices, the second power supply has separate power input terminal and power output terminal for receiving and outputting power.

In one or more exemplary hearing devices, a second power output terminal (not shown) of the first power supply may be connected to a second power rail 18, e.g. for feeding a second voltage/power to the processing unit 4. Further, the second power supply 20 may comprise a second power terminal (not shown) operating at second voltage and being connected to the second power rail 14 for input and/or output of power to/from the second power supply 20 as described in relation to the power terminal 23.

The hearing device 2 comprises a magnetic induction unit 10 configured for reception and/or transmission of wireless signals including a first wireless signal 26. The magnetic induction unit 10 may be configured to convert the first wireless signal 26 to an electrical signal 28 that is fed to the processing unit 4 and/or to convert an electrical signal 30 from the processing unit 4 to first wireless signal 8. The electrical signals 28, 30 may be data and/or control signals.

The magnetic induction unit 10 comprises a power input terminal 32 for receiving power from the first power supply 8 and/or the second power supply 20 via transceiver power rail 34.

The first power supply 8 is a switch-mode power supply (or another noisy power supply) and is connected to the main power source 6 for providing electrical power to one or more electrical components of the hearing device including the magnetic induction unit 10 and/or the second power supply 20. The first power supply 8 comprises a power input terminal 24 connected to the first power rail 14 for receiving power from the main power source 6. The first power supply 8 comprises a first power output terminal 36 for feeding power to the magnetic induction unit 10 and/or the second power supply 20 via transceiver power rail 34.

The magnetic induction unit 10 may have a first control output 40 connected to a control input 42 of the first power supply 8 by a first control signal 44 via first control connection 46 for controlling the first power supply 8. For example, the magnetic induction unit 10 may activate and/or deactivate, e.g. turn on and/or off, the first power supply 8 via first control signal 44. In one or more exemplary hearing devices, the first control signal 44 may be fed from the processing unit 4.

The second power supply 20 may comprise a control input 48 for receiving a control signal from the magnetic induction unit 10.

The magnetic induction unit 10 may have a second control output 50 optionally connected to the control input 48 of the second power supply 20 for sending a second control signal 52 via second control connection 54. For example, the magnetic induction unit 10 may activate and/or deactivate, e.g. turn on and/or off, the second power supply 20 via second control signal 52. In one or more exemplary hearing devices, the second control signal 52 may be fed from the processing unit 4.

In one or more exemplary hearing devices, the first control signal 44 may be fed from the first control output 40 to the control input 48, i.e. the control input 48 of the second power supply 20 may be connected to the first control connection 46.

The magnetic induction unit 10 is configured to deactivate the first power supply 8 during reception of wireless signals, i.e. during reception periods of the magnetic induction unit 10, e.g. via first control signal 44. Further, the second power supply 20 is configured to supply power to the magnetic induction unit 10 during reception of wireless signals via transceiver power rail 34, e.g. based on first control signal 44 and/or second control signal 52.

The magnetic induction unit 10 is configured to (via first control signal 44) activate the first power supply 8 during transmission of wireless signals. In other words, the first power supply 8 feeds power to the magnetic induction unit 10 during transmission periods of the magnetic induction unit 10 and optionally supplies power to the second power supply 20, during transmission of wireless signals. Thus, a capacitor 22 of the second power supply 20 may be charged during transmission periods and discharged during reception periods of the magnetic induction unit 10.

In one or more exemplary hearing devices, to deactivate the first power supply 8 comprises to deactivate the first power supply 8 by transmitting a control signal (first control signal 44) to the first power supply 8 from the magnetic induction unit 10 and/or from the processing unit 4.

The hearing device 2 may comprise one or more microphones including microphone 60 for provision of one or more input signals including a first input signal 60A to the processing unit 4. The processing unit 4 processes input signal(s) including first input signal 60A from the microphone 60 and/or optionally electrical signal 28 from magnetic induction unit 10/radio transceiver (not shown in FIG. 1) and provides an output signal 62 to a receiver 64, such as an output transducer, for conversion of the output signal 62 to an audio output signal 64A.

Thus, in one or more exemplary hearing devices the first power supply 8 is configured to supply power to the second power supply 20 during transmission of wireless signals.

Figure 2:
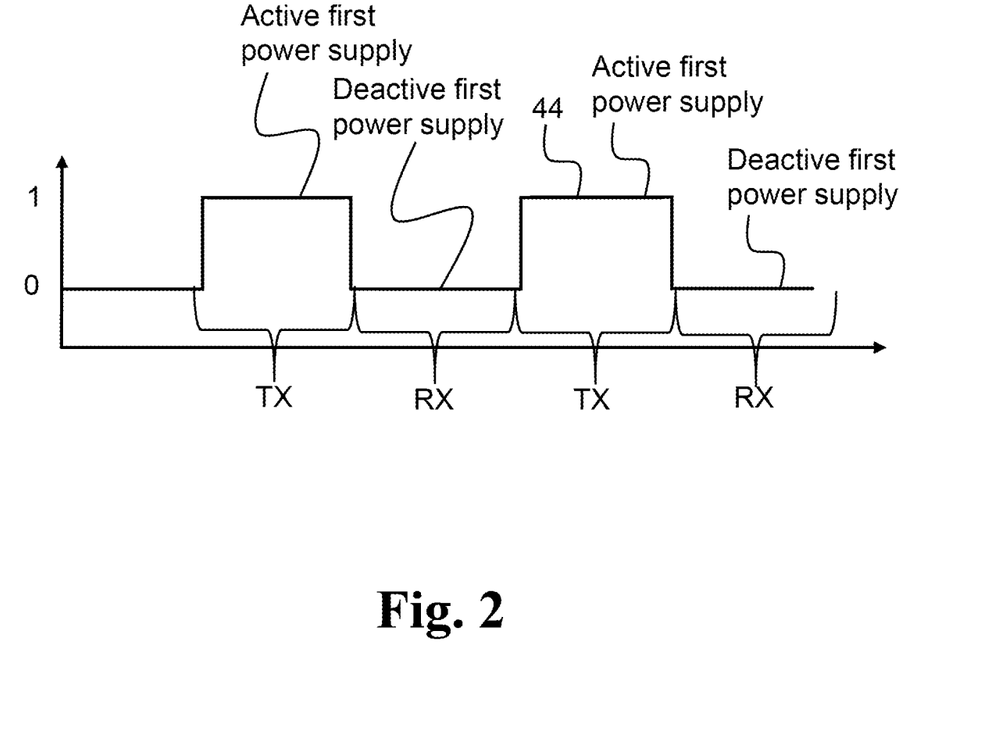
FIG. 2 illustrates activation and deactivation of first power supply.

FIG. 2 illustrates exemplary activation and deactivation of first power supply, where the graph illustrates first control signal 44 from magnetic induction unit 10 or processing unit 4 (shown in FIG. 1), where first control signal 44 being high or logical "1" indicates active first power supply and low or logical "0" indicates de-active first power supply. The first control signal 44 goes high during, e.g. (shortly) after beginning of, transmission TX and goes low during and optionally (shortly) before reception RX in the magnetic induction unit 10. The switch in first control signal 44 may be aligned with beginning and end of TX and RX. The first control signal 44 may have a duty cycle in the range from 10% to 90%, such as about 50%, wherein the duty cycle indicates a relationship between TX and RX periods. In one or more exemplary hearing devices, the first control signal (inverted) is used as a control signal to the second power supply unit, i.e. where first control signal 44 being high or logical "1" indicates de-active second power supply (and charging of capacitor of second power supply), and low or logical "0" indicates active second power supply.

Active first power supply is intended to mean that the first power supply feeds power to one or more electrical component including the magnetic induction unit, while de-active first power supply is intended to mean that no power is supplied and no switching is performed in the switch-mode power supply (the noise-generating operation of the first power supply is paused or turned off).

Active second power supply is intended to mean that the second power supply feeds power to one or more electrical component including the magnetic induction unit.

In a simpler implementation of the second power supply without active switching of the second power supply, e.g. by control signals 44 or 52, the capacitor 22 of the second power supply takes over by (noise-free) power supply to the magnetic induction unit during reception.

Figure 3:
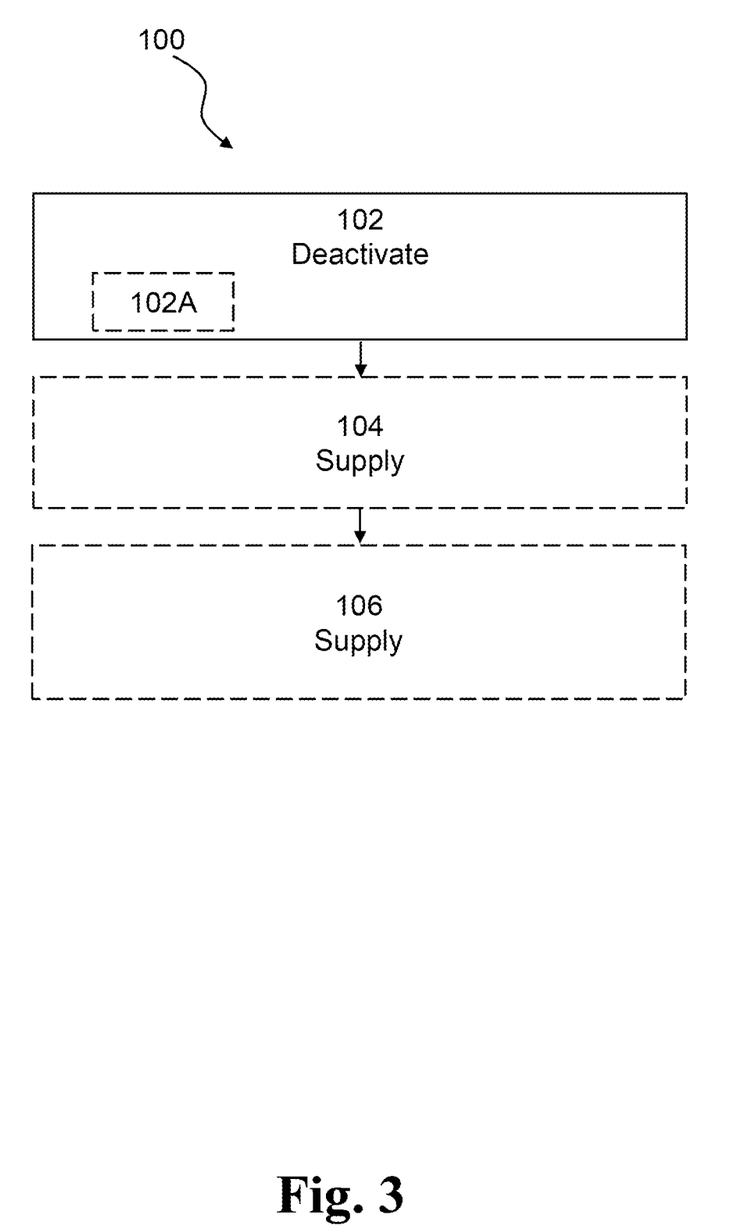
FIG. 3 is a flow diagram of an exemplary method according to the disclosure.

FIG. 3 is a flow diagram of an exemplary method according to the disclosure, such as a method 100 performed in a hearing device (such as the hearing device disclosed herein, such as the hearing device 2 of FIG. 1), for power supply management of a hearing device comprising a processing unit; a main power source; a first power supply, and a magnetic induction unit configured for reception and transmission of wireless signals. The method 100 comprises deactivating 102 the first power supply during reception of wireless signals.

In one or more exemplary methods and/or hearing devices, the method 100 comprises supplying 104 power to the magnetic induction unit from a second power supply and/or the main power source during reception of wireless signals.

In one or more exemplary methods and/or hearing devices, the method 100 comprises supplying 106 power to the second power supply from the first power supply during transmission of wireless signals.

In one or more exemplary methods and/or hearing devices, to deactivate 102 the first power supply comprises transmitting 102A a control signal to the first power supply from the magnetic induction unit or from the processing unit.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in the order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2 hearing device
4 processing unit
6 main power source
8 first power supply
10 magnetic induction unit
12 first power output terminal of main power source
14 first power rail
16 second power output terminal of main power source
18 second power rail
20 second power supply
22 first capacitor
24 power input terminal of first power supply
26 first wireless signal
28 electrical signal to the processing unit
30 electrical signal to the magnetic induction unit
32 power input terminal of magnetic induction unit
34 transceiver power rail
36 power output terminal of first power supply
40 first control output
42 control input of first power supply
44 control signal
46 first control connection
48 control input of second power supply
50 second control output
52 control signal
54 second control connection
60 microphone
60A first input signal
62 output signal
64 receiver
64A audio output signal
100 method for power supply management of a hearing device
102 deactivating the first power supply during reception of wireless signals
102A transmitting a control signal to the first power supply from the magnetic induction unit or from the processing unit
104 supplying power to the magnetic induction unit from a second power supply during reception of wireless signals
106 supplying power to the second power supply from the first power supply during transmission of wireless signals.

The invention claimed is:

1. A hearing device comprising:
a processing unit;
a main power source;
a first power supply connected to the main power source; and
a magnetic induction unit configured to receive wireless signals;
wherein the hearing device is configured to deactivate the first power supply during reception of the wireless signals.

2. The hearing device according to claim 1, further comprising a second power supply configured to supply power to the magnetic induction unit during reception of the wireless signals.

3. The hearing device according to claim 2, wherein the magnetic induction unit is also configured to transmit other wireless signals, and wherein the first power supply is configured to supply power to the second power supply during transmission of the other wireless signals.

4. The hearing device according to claim 2, wherein the second power supply comprises a capacitor.

5. The hearing device according to claim 1, wherein the magnetic induction unit is also configured to transmit other wireless signals.

6. The hearing device according to claim 5, wherein the first power supply is configured to supply power to a second power supply during transmission of the other wireless signals.

7. The hearing device according to claim 1, wherein the first power supply comprises a switch-mode power supply.

8. The hearing device according to claim 1, wherein the first power supply is configured to be deactivated based on a control signal.

9. A hearing device comprising:
a processing unit;
a main power source;
a first power supply connected to the main power source; and
a magnetic induction unit configured to receive wireless signals;
wherein the hearing device is configured to deactivate the first power supply during reception of the wireless signals;
wherein the first power supply is configured to be deactivated based on a control signal; and
wherein the control signal is provided by the magnetic induction unit.

10. A hearing device comprising:
a processing unit;
a main power source;
a first power supply connected to the main power source; and
a magnetic induction unit configured to receive wireless signals;
wherein the hearing device is configured to deactivate the first power supply during reception of the wireless signals;
wherein the first power supply is configured to be deactivated based on a control signal; and
wherein the control signal is provided by the processing unit.

11. A hearing device comprising:
a processing unit;
a main power source;
a first power supply connected to the main power source; and
a magnetic induction unit configured to receive wireless signals;
wherein the hearing device is configured to deactivate the first power supply during reception of the wireless signals;
wherein the first power supply is configured to be deactivated based on a control signal; and
wherein the first power supply is configured to be deactivated in response to receipt of the control signal.

12. A method performed by a hearing device, the hearing device comprising a processing unit, a main power source, a first power supply, and a magnetic induction unit, the method comprising:
receiving wireless signals by the magnetic induction unit; and deactivating the first power supply during reception of the wireless signals.

13. The method according to claim 12, further comprising supplying power to the magnetic induction unit from a second power supply during reception of the wireless signals.

14. The method according to claim 13, further comprising:
   transmitting other wireless signals by the magnetic induction unit, and
   supplying power to the second power supply from the first power supply during transmission of the other wireless signals.

15. The method according to claim 13, wherein the second power supply comprises a capacitor.

16. The method according to claim 12, further comprising transmitting other wireless signals by the magnetic induction unit.

17. The method according to claim 16, further comprising supplying power to a second power supply from the first power supply during transmission of the other wireless signals.

18. The method according to claim 12, wherein the first power supply comprises a switch-mode power supply.

19. The method according to claim 12, wherein the first power supply is deactivated based on a control signal.

20. A method performed by a hearing device, the hearing device comprising a processing unit, a main power source, a first power supply, and a magnetic induction unit, the method comprising:
   receiving wireless signals by the magnetic induction unit;
   providing a control signal by the magnetic induction unit; and
   deactivating the first power supply during reception of the wireless signals, wherein the first power supply is deactivated based on the control signal.

21. A method performed by a hearing device, the hearing device comprising a processing unit, a main power source, a first power supply, and a magnetic induction unit, the method comprising:
   receiving wireless signals by the magnetic induction unit;
   providing a control signal by the processing unit; and
   deactivating the first power supply during reception of the wireless signals, wherein the first power supply is deactivated based on the control signal.

22. A method performed by a hearing device, the hearing device comprising a processing unit, a main power source, a first power supply, and a magnetic induction unit, the method comprising:
   receiving wireless signals by the magnetic induction unit; and
   deactivating the first power supply based on a control signal during reception of the wireless signals;
   wherein the first power supply is deactivated in response to receipt of the control signal.

* * * * *